(12) United States Patent
Murase et al.

(10) Patent No.: US 6,935,312 B2
(45) Date of Patent: Aug. 30, 2005

(54) INTERNAL COMBUSTION ENGINE AND IGNITION CONTROL METHOD

(75) Inventors: Nao Murase, Susono (JP); Hiroki Ichinose, Fujinomiya (JP); Yuuichi Katou, Susono (JP); Masahiro Ozawa, Toshima-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/792,928

(22) Filed: Mar. 5, 2004

(65) Prior Publication Data

US 2004/0177833 A1 Sep. 16, 2004

(30) Foreign Application Priority Data

Mar. 11, 2003 (JP) .................................. 2003-064368

(51) Int. Cl.⁷ .............................. F02P 5/15; R02D 41/06
(52) U.S. Cl. ........................... 123/406.54; 123/406.47; 123/491
(58) Field of Search ................. 123/406.47, 406.53, 123/406.54, 491, 179.5, 179.16, 79.18; 701/113

(56) References Cited

U.S. PATENT DOCUMENTS

| | | | | | |
|---|---|---|---|---|---|
| 4,408,582 | A | * | 10/1983 | Merrick | 123/406.53 |
| 4,538,573 | A | * | 9/1985 | Merrick | 123/406.53 |
| 4,712,527 | A | * | 12/1987 | Staerzl | 123/406.53 |
| 5,123,390 | A | * | 6/1992 | Okuda | 123/406.53 |
| 5,357,927 | A | * | 10/1994 | Saito et al. | 123/406.54 |
| 6,505,594 | B1 | * | 1/2003 | Katayama et al. | 123/406.54 |

FOREIGN PATENT DOCUMENTS

| | | |
|---|---|---|
| JP | A 8-28417 | 1/1996 |
| JP | A 10-47039 | 2/1998 |
| JP | A 2000-205029 | 7/2000 |

* cited by examiner

*Primary Examiner*—Willis R. Wolfe, Jr.
(74) *Attorney, Agent, or Firm*—Oliff & Berridge, PLC

(57) ABSTRACT

An ECU executes a determination process determining whether the rate of increase in the engine speed is above a prescribed rate immediately after the engine start, and if so, delays the ignition timing.

17 Claims, 3 Drawing Sheets

INTERNAL COMBUSTION ENGINE AND IGNITION CONTROL METHOD

INCORPORATION BY REFERENCE

The disclosure of Japanese Patent Application No. 2003-064368 filed on Mar. 11, 2003 including the specification, drawings and abstract is incorporated herein by reference in its entirety.

BACKGROUND OF THE INVENTION

1. Field of the Invention

The invention relates to ignition control in an internal combustion engine.

2. Description of the Related Art

A three way catalyst is widely used to remove harmful substances contained in exhaust gas from an internal combustion engine (i.e., exhaust emissions), such as carbon monoxide (CO), hydro carbon (HC), nitrogen oxide (NOX). A catalyst of this type however needs to be heated up to a specific activation temperature to utilize its purification capacity sufficiently. In other words, when its temperature is below that activation temperature, some harmful substances, particularly CO, can not be removed sufficiently. To counter this, therefore, various methods have been proposed and employed in which the timing of igniting an air-fuel mixture within each combustion chamber (will be referred to as "ignition timing") is delayed so as to increase the temperature of exhaust gas (will be referred to as "exhaust temperature") and thereby accelerate the activation of the catalyst.

Meanwhile, there is fuel for internal combustion engines which is less volatile than ordinary fuel. Hereinafter, such fuel will be called "heavy fuel" and ordinary fuel will be called "light fuel." When heavy fuel is used, therefore, if the ignition timing is delayed in the same manner as when light fuel is used, it would result in reduced fuel economy, misfires, generation of insufficient torque, and so on. To avoid such drawbacks, a known method has been used to set the ignition timing in accordance with the engine speed (see Japanese laid-opened patent application No. 10-47039).

According to this method, more specifically, if the engine speed is above a prescribed value, it is determined that light fuel is being used and the ignition timing is therefore delayed. If the engine speed is below the same prescribed value, conversely, the ignition timing is advanced. As well as this example, there is another known method of identifying such a fuel type. According to this method, whether light or heavy fuel is used is determined based on the maximum value of the engine speed or its approximate value detected when the coolant temperature is within a specific range and the engine is idling after engine start (see Japanese laid-opened patent application No. 2000-205029).

In either method, however, it takes some time before the above-described delay of the ignition timing is actually carried out. Therefore, the catalyst can not be warmed quickly, and more importantly, it is difficult to reduce exhaust emissions, especially HC, during an engine start operation to the extent necessary to comply with vehicle emission regulation requirements that have recently become stricter.

SUMMARY OF THE INVENTION

In view of the above situation, the present invention has been made to provide an internal combustion engine that advantageously reduces exhaust gas emissions during engine start through ignition control and an ignition control method corresponding to the ignition control procedure adopted in such an internal combustion engine.

A first aspect of the present invention relates to an internal combustion engine generating power through combustion of fuel within a combustion chamber, and including an igniter for igniting the fuel in the combustion chamber, an engine speed detector for detecting the engine speed, and an ignition controller. This ignition controller is adapted to execute, at a specific timing immediately after the internal combustion engine has been started, a determination process determining whether the rate of increase in the engine speed detected via the engine speed detector is above a prescribed rate, and delay an ignition timing at which the fuel is ignited via the igniter if the same rate is above the prescribed rate.

Having the above construction, the internal combustion engine determines whether to delay its ignition timing based on the rate of increase in the engine speed detected immediately after the engine start, and thus is able to delay, if necessary, the ignition timing immediately after the engine start, which enables, for example, a catalyst disposed in the exhaust system to be warmed up more quickly. Also, since the rate of increase in the engine speed immediately after the engine start is different depending on whether ordinary fuel (i.e., light fuel) or less volatile fuel (i.e., heavy fuel) is used. Therefore, it is possible to delay the ignition timing in accordance with such a volatility type or state of fuel immediately after the engine start and thereby reduce exhaust emissions (especially HC) advantageously.

A second aspect of the invention relates to a method of controlling an ignition timing in an internal combustion engine generating power through combustion of fuel within a combustion chamber. This method includes the steps of (i) executing a determination process determining whether the rate of increase in the engine speed is above a prescribed rate at a specific timing immediately after the internal combustion engine has been started, and (ii) delaying an ignition timing at which the fuel is ignited if the same rate is above the prescribed rate.

According to this method, the same advantages as obtained with the internal combustion engine of the first aspect of the invention can be obtained.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF THE PREFERRED EMBODIMENTS

Figure 1:
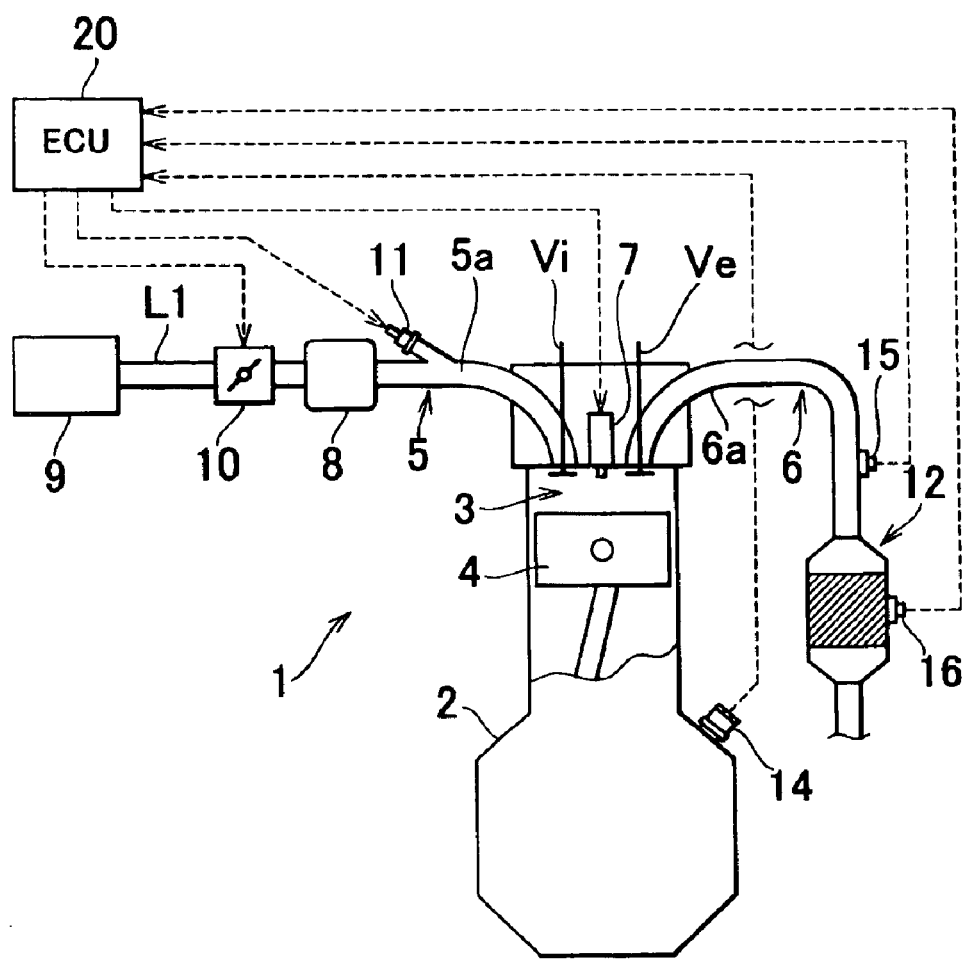
FIG. 1 is a view schematically showing an ignition control system of an internal combustion engine according to one embodiment of the present invention.

Hereinafter, exemplary embodiments of the present invention will be described with reference to the accompanying drawings. FIG. 1 is a view schematically showing an ignition control system of an internal combustion engine 1 according to one embodiment of the invention. Referring to FIG. 1, fuel is combusted in the form of an air-fuel mixture within a combustion chamber 3 formed in a cylinder block 2. Driven by such fuel combustion, a piston 4 reciprocates in each cylinder thereby generating driving force. The internal combustion engine 1 is preferably constructed as a multi-cylinder engine, such as a four-cylinder engine, although FIG. 1 only shows the construction of one cylinder and this embodiment will hereinafter be described with reference to this cylinder and its related components as a representative for descriptive convenience.

Referring to FIG. 1, an intake port for the combustion chamber 3 is connected to an intake pipe 5a forming one portion of an intake manifold 5 while an exhaust port is connected to an exhaust pipe 6a forming one portion of an exhaust manifold 6. Within a cylinder head of the internal combustion engine 1 are provided an intake valve Vi for opening/closing the intake port and an exhaust valve Ve for opening/closing the exhaust port. These valves are driven via valve drive devices, not shown in the drawings, each incorporating a variable valve timing mechanism. Also, a spark plug 7 is provided in the cylinder head.

The intake manifold 5 (i.e., intake pipe 5a) is connected to a surge tank 8, and the surge tank 8 is connected to an intake passageway L1, and the intake passageway L1 is connected via an air cleaner 9 to an air outlet, not shown in the drawings. Also, a throttle 10 is provided along the intake passageway L1 between the surge tank 8 and the air cleaner 9. An injection valve 11 is provided in the intake manifold 5a and connected to a fuel tank via a fuel pump, both not shown in the drawing. The injection valve 11 injects fuel, such as gasoline, into the intake manifold 5a, and the injected fuel is then mixed up with air from the surge tank 8 and drawn into the combustion chamber 3 in the form of an air-fuel mixture. Meanwhile, the exhaust manifold 6 is connected to a catalyst (i.e., three way catalyst) 12.

The spark plug 7, the throttle 10, and the injection valve 11 are all connected to an ECU (Electronic Control Unit) 20 governing the operation of the internal combustion engine 1. The ECU 20 includes a CPU, ROM, RAM, input/output ports, data storage, etc. as its main components. Furthermore, a crank angle sensor 14 for detecting the crank angle of the internal combustion engine 1, an exhaust temperature sensor 15 for measuring the temperature of exhaust gas flowing through the exhaust manifold 6, a catalyst temperature sensor 16 for measuring the temperature of the catalyst 12, etc, are provided and electrically connected to the ECU 20.

In operation, the ECU 20 detects the engine speed based on signals from the crank angle sensor 14, and uses the detected engine speed, as well as the exhaust temperature, catalyst temperature, etc., measured via the above-stated sensors, in controlling the related devices including the spark plug 7, the throttle 10, the injection valve 11, and the valve drive devices. That is, the ECU 20 is configured to act as an ignition controller for setting the ignition timing of the spark plug 7, namely delaying or advancing the same timing using signals from the sensors.

Figure 2:
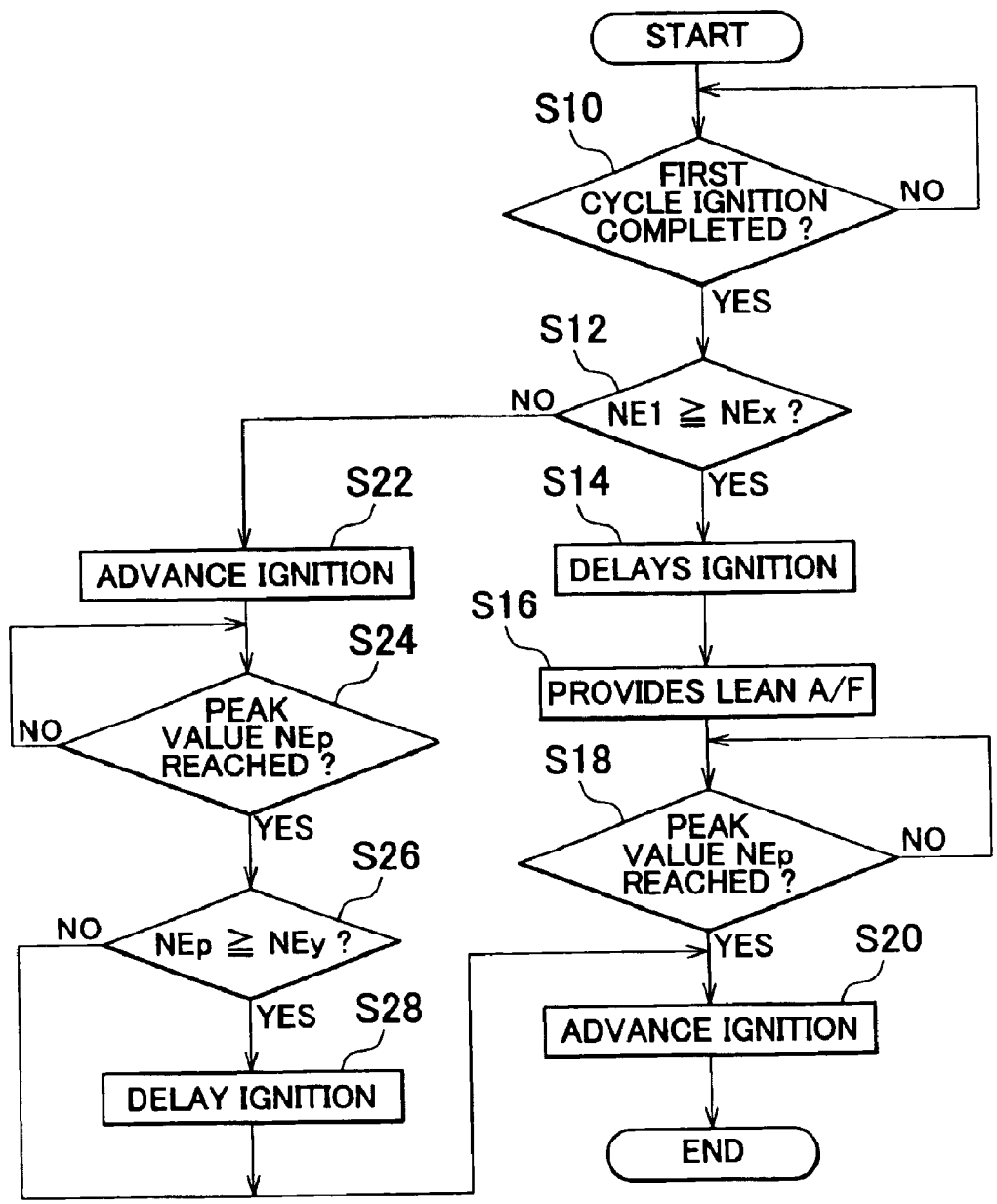
FIG. 2 is a flowchart representing a start-up procedure of the internal combustion engine shown in FIG. 1.

Hereinafter, a start-up procedure executed by the ECU 20 upon starting the internal combustion engine 1 will be described with reference to FIG. 2 and FIG. 3. FIG. 2 is a flowchart showing the routine of the same procedure. Referring to this chart, after an operator has started the internal combustion engine 1 by operating an ignition key or the like, the ECU 20 first determines if the spark plug 7 has been fired to bring about fuel combustion in the combustion chamber 3 for a first cycle of the engine operation (step S10). Such an ignition will be referred to as "first ignition."

Figure 3:
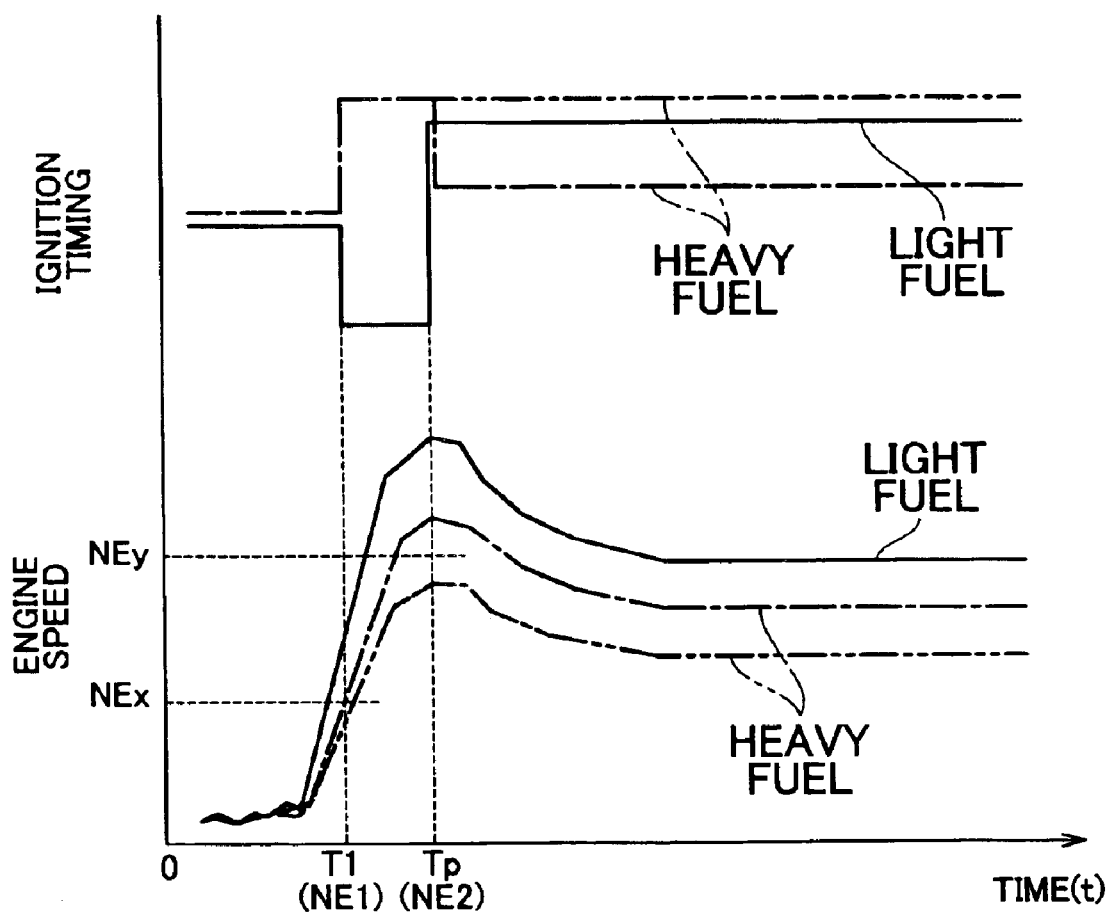
FIG. 3 is a timechart representing the relationship between the ignition timing and the engine speed observed during the start-up procedure.

If the ECU 20 determines that the first ignition has already been finished, referring to FIG. 3, the ECU 20 then obtains the value of engine speed NE1 (time T1), and compares engine speed NE1 with threshold NEx (step S12). If engine speed NE1 is determined to be above threshold NEx, the ECU 20 then delays the ignition timing of the spark plug 7 by an appropriate amount (step S14). According to the exemplary embodiment, threshold NEx is a preset value stored in the data storage of the ECU 20 which has basically been determined with respect to a case where light fuel is used, and in consideration of various conditions related to the operation of the internal combustion engine 1.

That is, when the first ignition has been finished and thus combustion of an air-fuel mixture in the combustion chamber 3, it causes the piston 4 to move so that the engine speed starts increasing accordingly.

In the meantime, due to the difference in the volatility between light fuel (i.e., ordinary fuel) and heavy fuel, the value of engine speed NE1 substantially indicating the present rate of increase in the engine speed after the engine start would be different depending on whether light fuel or heavy fuel is used, as shown in the lower region of FIG. 3 where the solid line curve represents changes in the engine speed observed when light fuel is used and the single-dotted line curve represents those observed when heavy fuel is used.

When light fuel is used, more specifically, the value of engine speed NE1, namely the rate of increase in the engine speed occurring from the engine start to time T1 where the first ignition has just been completed is larger than when heavy fuel is used. Upon completion of the first ignition, therefore, it is possible to determine whether light fuel or heavy fuel is used in the internal combustion engine 1 according to the value of engine speed NE1 being above or below threshold NEx, and time T1 is therefore considered to be the earliest timing of determining, for example, whether to delay the ignition timing if light fuel is used.

Through the above-stated processes (steps S10, S12), the ECU 20 determines whether light fuel or heavy fuel is used, and delays the ignition timing by an appropriate amount (step S14) if light fuel is used, as shown in the upper region of FIG. 3 where the solid line represents changes in the ignition timing in case of light fuel and the dotted lines both represent changes in the ignition timing in case of heavy fuel. When each line rises, it indicates that the ignition timing is advanced. When each line drops down, conversely, it indicates that the ignition timing is delayed. Also, the amount that the line rises or drops corresponds to the amount by which the ignition timing is advanced or delayed.

With the internal combustion engine having the foregoing construction, it is possible to delay the ignition timing of the spark plug 7 immediately after engine start and thereby increase the exhaust temperature quickly. This promotes so-called "after-burning" of HC within the exhaust manifold 6 and accelerates the warming-up of the catalyst 12. In this way, when light fuel is used in the internal combustion engine 1, exhaust emissions, especially HC, can be advantageously reduced.

After delaying the ignition timing in step S14, the ECU 20 then increases the air-fuel ratio maintained at the stoichiometric value so that it becomes lean using a map stored in the data storage of the ECU 20 (step S16). This promotes combustion of the residual fuel flowing out from the combustion chamber 3 through the exhaust manifold 6 as a result of the delayed ignition timing of the spark plug 7 (step S14), and thus further reduces the exhaust emissions.

Subsequently, the ECU 20 detects inflection points of the engine speed while monitoring signals from the crank angle sensor 14, and determines if the engine speed has reached peak value NEp (step S18). If yes, the ECU 20 advances the ignition timing by an appropriate amount (step S20).

By thus advancing the ignition timing when the engine speed has once reached peak value NEp, it is possible to reduce the amount of exhaust gas from the combustion chamber 3, and thereby reduce the exhaust emissions from the internal combustion engine 1 as a whole. After step S20, the routine ends.

If heavy fuel is used, conversely, the value of engine speed NE1 is smaller than when light fuel is used as mentioned above. Thus, if the value of engine speed NE1 is below threshold NEx (step S12), the ECU 20 determines that heavy fuel is used, and advances the ignition timing by an appropriate amount (time T1), as represented by the single-dotted line in FIG. 3 (step S22).

As described above, according to the embodiment, when heavy fuel is used in the internal combustion engine 1, the ignition timing is advanced immediately after engine start. That is, even if heavy fuel is used, fuel combustion in the combustion chamber 3 is promoted to enable stable operation of the internal combustion engine 1.

After advancing the ignition timing in step S22, the ECU 20 then detects inflection points of the engine speed while monitoring signals from the crank angle sensor 14, and determines if the engine speed has reached peak value NEp (step S24). If yes, the ECU 20 then determines if peak value NEp is above threshold NEy (step S26). According to the exemplary embodiment, threshold NEy is a preset value stored in the data storage of the ECU 20 which has basically been set with respect to a case where heavy fuel is used, and in consideration of various conditions related to the operation of the internal combustion engine 1.

When peak value NEp is above threshold NEy, the ECU 20 then delays the ignition timing by an appropriate amount (time Tp). That is, according to the embodiment, when heavy fuel is used, the ignition timing is not delayed but advanced immediately after engine start (step S22) as stated above. In this case, however, the ignition timing is later delayed when the engine speed reaches peak value NEp that is above threshold NEy, so as to increase the temperature of exhaust gas and thus accelerate the warming up of the catalyst 12.

The ECU 20 maintains this delayed ignition timing for a predetermined length of time (e.g., 20 seconds), and thereafter advances it by an appropriate amount (step S20). After this step, the routine ends.

Meanwhile, if peak value NEp is below threshold NEy, the ECU 20 further advances the ignition timing in step S20 by an appropriate amount, after which the routine ends. The double-dotted line in FIG. 3 represents one exemplary case where peak value NEp is below threshold NEy, however it should be noted that this example refers to a case where the ignition timing is not advanced in step S20 but is kept unchanged.

According to the exemplary embodiment, as described so far, the ignition timing is delayed or advanced immediately after engine start depending upon the volatility type or state of fuel so as to reduce exhaust emissions, especially HC, advantageously during the engine start operation.

While the comparison between engine speed NE1 and threshed NEx (step S12) is made in response to detecting completion of the first ignition in the above exemplary embodiment (step S10), the same comparison may alternatively be made in response to the exhaust temperature exceeding a specific after-burning temperature which causes residual HC to burn within a portion of the exhaust system located upstream of the catalyst 12 (e.g., exhaust manifold 6). In this case, too, the ignition timing is delayed or advanced immediately after engine start depending upon the volatility type or state of fuel so as to reduce exhaust emissions, especially HC, advantageously during the engine start operation.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine generating power through combustion of fuel within a combustion chamber, comprising:

an igniter for igniting the fuel in the combustion chamber;

an engine speed detector for detecting an engine speed of the internal combustion engine; and an ignition controller adapted to execute, at a specific timing immediately after the internal combustion engine has been started, a determination process determining whether the rate of increase in the engine speed detected via the engine speed detector is above a prescribed rate, and delay an ignition timing at which the fuel is ignited via the igniter if the same rate is above the prescribed rate.

2. An internal combustion engine according to claim 1, wherein the ignition controller is further adapted to execute the determination process at a moment, as the specific timing, when a first ignition of fuel is completed.

3. An internal combustion engine according to claim 2, wherein the ignition controller is further adapted to determine during the determination process that the rate of increase in the engine speed is above the prescribed rate if the engine speed detected via the engine speed detector is above a prescribed speed.

4. An internal combustion engine according to claim 1, wherein the ignition controller is further adapted to maintain the delayed ignition timing until the engine speed once reaches a peak value after the engine start, and advance the ignition timing in response to the engine speed reaching the peak value.

5. An internal combustion engine according to claim 1, wherein the fuel is supplied in the form of an air-fuel mixture; and the ignition controller is further adapted to increase the air-fuel ratio of the air-fuel mixture after delaying the ignition timing.

6. An internal combustion engine according to claim 1, wherein the ignition controller is further adapted to delay, even if it has been determined during the determination process that the increase rate is below the prescribed rate, the ignition timing when the engine speed later reaches a peak value that is larger than a prescribed value.

7. An internal combustion engine according to claim 1, further comprising an exhaust temperature detector for detecting a temperature of exhaust gas from the combustion chamber, wherein the ignition controller is further adapted to execute the determination process at a moment, as the specific timing, when the temperature of exhaust gas detected via the exhaust temperature detector reaches a temperate which causes spontaneous combustion of a specific substance contained in the exhaust gas.

8. An internal combustion engine according to claim 7, wherein the specific substance is hydrocarbon.

9. A method of controlling an ignition timing in an internal combustion engine generating power through combustion of fuel within a combustion chamber, comprising the steps of:
  executing a determination process determining whether the rate of increase in the engine speed is above a prescribed rate at a specific timing immediately after the internal combustion engine has been started; and
  delaying an ignition timing at which the fuel is ignited if the same rate is above the prescribed rate.

10. A method according to claim 9, wherein the specific timing is when a first ignition of the fuel is completed.

11. A method according to claim 10, wherein
  it is determined during the determination process that the rate of increase in the detected engine speed is above the prescribed rate if an engine speed of the internal combustion engine is above a prescribed speed.

12. A method according to claim 9, wherein
  the delayed ignition timing is maintained until the engine speed once reaches a peak value after the engine start; and
  the ignition timing is advanced in response to the engine speed reaching the peak value.

13. A method according to claim 9, wherein
  the fuel is supplied in the form of an air-fuel mixture; and
  the air-fuel ratio of the air-fuel mixture is increased after delaying the ignition timing.

14. A method according to claim 9, wherein even if it has been determined during the determination process that the increase rate is below the prescribed rate, the ignition timing is later delayed when the engine speed reaches a peak value that is larger than a prescribed value.

15. A method according to claim 9, wherein
  the specific timing is when the temperature of an exhaust gas from the combustion chamber reaches a temperate which causes spontaneous combustion of a specific substance contained in the exhaust gas.

16. A method according to claim 15, wherein the specific substance is hydrocarbon.

17. An internal combustion engine generating power through combustion of fuel within a combustion chamber, comprising:
  igniting means for igniting the fuel in the combustion chamber;
  engine speed detecting means for detecting an engine speed of the internal combustion engine; and
  ignition controlling means for executing, at a specific timing immediately after the internal combustion engine has been started, a determination process determining whether the rate of increase in the engine speed detected via the engine speed detecting means is above a prescribed rate, and delay an ignition timing at which the fuel is ignited via the igniting means if the same rate is above the prescribed rate.

* * * * *